United States Patent [19]

Smith

[11] 4,349,888
[45] Sep. 14, 1982

[54] CMOS STATIC ALU

[75] Inventor: Philip S. Smith, Austin, Tex.

[73] Assignee: Motorola, Inc., Schaumburg, Ill.

[21] Appl. No.: 185,073

[22] Filed: Sep. 8, 1980

[51] Int. Cl.³ .......................... G06F 7/48; G06F 7/50
[52] U.S. Cl. .................................... 364/716; 307/469
[58] Field of Search ............... 364/715, 716; 307/468, 307/469, 471

[56] References Cited

U.S. PATENT DOCUMENTS

| | | | |
|---|---|---|---|
| 3,767,906 | 10/1973 | Pryor | 364/716 |
| 4,039,858 | 8/1977 | Stewart | 307/471 X |
| 4,225,934 | 9/1980 | Vandierendonck | 364/716 |
| 4,229,803 | 10/1980 | Rhodes | 364/716 X |

Primary Examiner—Jerry Smith
Attorney, Agent, or Firm—Anthony J. Sarli, Jr.; Joseph E. Barbee; Jeffrey Van Myers

[57] ABSTRACT

A CMOS static ALU is capable of selecting one operand from a plurality of inputs and can perform various arithmetic and logic operations in addition to shift left and shift right operations. The ALU uses exclusive OR gates having a minimum number of transistors. In addition, more N-channel transistors are used than P-channel transistors which results in overall smaller size and faster operation. In addition, the ALU has a RAM cell for use as a temporary storage means which is capable of driving the ALU data bus.

6 Claims, 2 Drawing Figures

| FUNCTION | A | $\bar{A}$ | $S_1$ | $S_2$ | L | $C_{in}$ |
|---|---|---|---|---|---|---|
| Σ | 1 | 0 | 1 | 1 | 0 | 0/1 |
| XOR | 1 | 0 | 1 | 1 | 1 | 0 |
| OR | 1 | 0 | 0 | 0 | 1 | 0 |
| AND | 1 | 0 | 0 | 1 | 1 | 0 |
| DB → 0 | X | X | 0 | 0 | 1 | 0 |
| S/L-S/R | 0 | 0 | 1 | 1 | X | 0 |

FIG 2

CMOS STATIC ALU

This invention relates, in general, to arithmetic logic units, and more particularly, to a CMOS static arithmetic logic unit.

Arithmetic logic units (ALU) are widely used in digital computing systems. More recently, the ALU has been integrated onto the same chip and made a part of a microprocessor. In the past, these ALUs have had the capability to add, subtract, compare, shift right, shift left, and perform certain types of logic operations. However, when the ALU is integrated onto the same circuit as the microprocessor unit it is desirable to keep the number of components used by the ALU to a minimum so that the ALU will not occupy too large of an area of silicon on the chip. Therefore, it would be advantageous to make the ALU small in size but yet capable of performing the necessary functions required by the associated microprocessor.

Accordingly, it is an object of the present invention to provide a CMOS static ALU which has more N-channel transistors than P-channel transistors.

Another object of the present invention is to provide an ALU which is capable of selecting one of a plurality of inputs wherein the selection process is accomplished by using a single field effect transistor.

Yet another object of the present invention is to provide an ALU having logic gates which use a minimum number of transistors.

Yet a further object of the present invention is to provide an ALU having a RAM cell for a temporary storage means which is capable of driving a data bus.

SUMMARY OF THE INVENTION

In carrying out the above and other objects of the present invention, there is provided in one form, an arithmetic and logic unit (ALU) capable of selecting one of a plurality of inputs and logically combining the selected inputs with an operand. The ALU includes means for selecting one of a plurality of inputs and means for strobing the selected input to a first logic means. The first logic means also receives as an input the operand which is to be logically combined with the strobed selected input. A second logic means combines the output of the first logic means with a carry-in input. The output of the second logic means is coupled to a temporary storage means where the output is temporarily stored until clocked out of the storage means.

The subject matter which is regarded as the invention is set forth in the appended claims. The invention itself, however, together with further objects and advantages thereof, may be better understood by referring to the following detailed description taken in conjunction with the accompanying drawings.

BRIEF DESCRIPTION OF THE DRAWINGS

FIG. 2 is a table which illustrates the functions which can be carried out by an ALU having the circuitry shown in FIG. 1.

Figure 1:
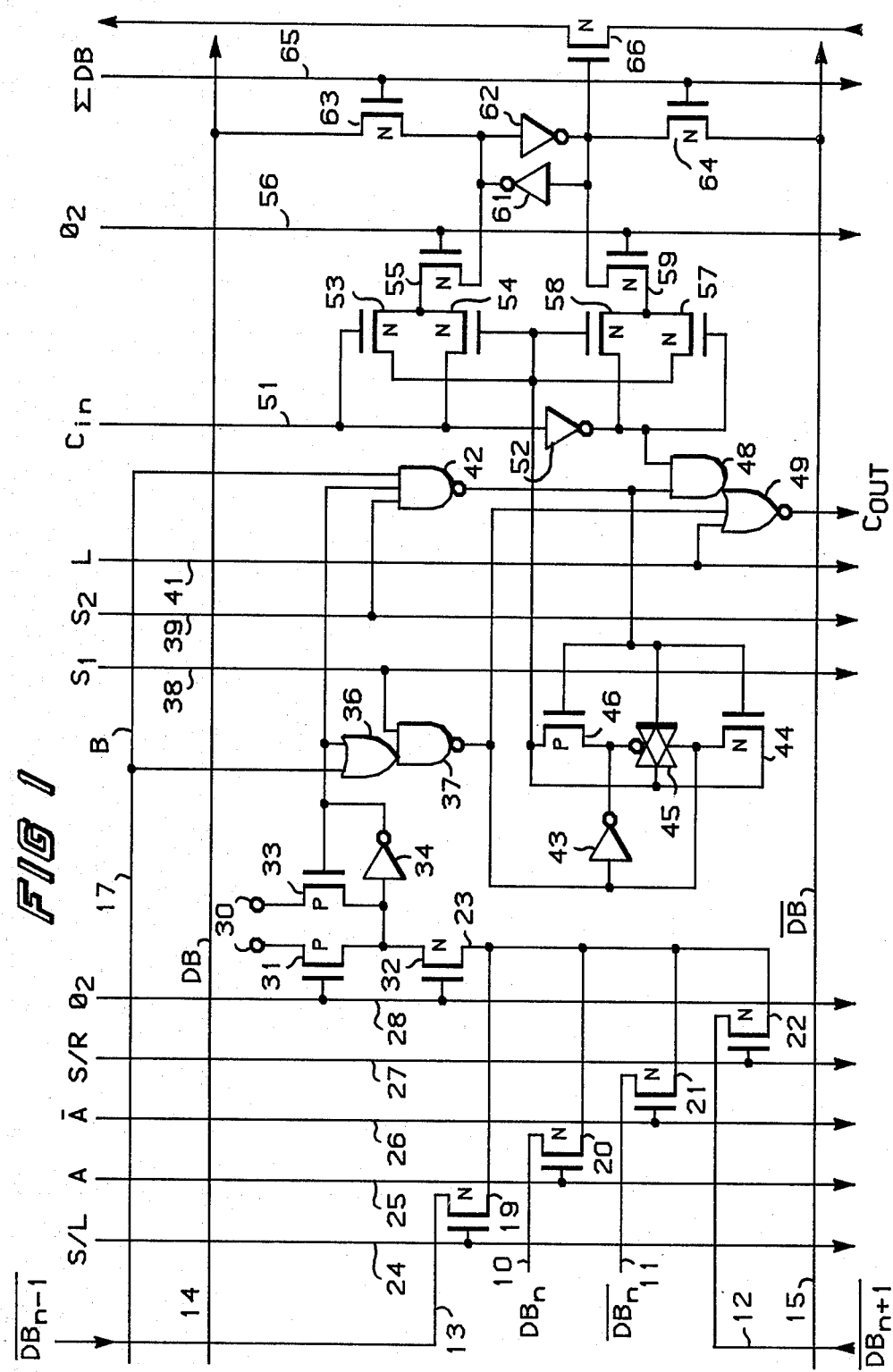
FIG. 1 illustrates ALU circuitry necessary to process one bit of data for an ALU incorporating the present invention.

The exemplification set out herein illustrates the preferred embodiment of the invention in one form thereof and such exemplification is not to be construed as limiting in any manner.

DETAILED DESCRIPTION OF THE DRAWINGS

Shown in FIG. 1 is the circuitry for one bit of an arithmetic and logic unit (ALU). The circuitry illustrated in FIG. 1 would have to be duplicated to equal the number of bits desired to be processed by the ALU. If the ALU is intended to process four bits then there would be four sections of the ALU such as illustrated in FIG. 1. Such an ALU can be called a multiple bit ALU. For an eight bit ALU, the circuitry of FIG. 1 would be duplicated eight times and so on for any number of desired bits. One could visualize the circuit, as illustrated in FIG. 1, being stacked one on top of another to form an ALU capable of handling the desired number of bits.

The portion of the ALU illustrated in FIG. 1 is intended to be used with a dual bus system wherein the dual bus system is illustrated as data bus (DB) 14 and its complement data bus ($\overline{DB}$) 15. A buffered static representation of the information on data bus 14 is presented on line 10, and a buffered static representation of the information on data bus 15 appears on line 11. In a multiple bit ALU the preceding adjacent bit to the bit appearing on line 10 would appear on line 13, whereas, the adjacent bit after the bit appearing on line 10 would appear on line 12. This provides at least four inputs from which the ALU can select a first operand. These four inputs would be the selected bit (DBn), its complement ($\overline{DB_n}$), the bit prior to the selected bit ($\overline{DB_{n-1}}$) or the bit after the selected bit ($\overline{DB_{n+1}}$). Which one of the four inputs is selected is controlled by one of four control signals appearing on lines 24 through 27 respectively. Control line 24 carries a shift left (S/L) signal, control line 25 carries an $\overline{A}$ signal, control line 26 carries an A signal, and control line 27 carries a shift right (S/R) signal.

If shift left control line 24 is activated all the bits in a multiple bit ALU will be shifted one bit position to the left. If shift right control line 27 is activated all the bits in a multiple bit ALU will be shifted one bit position to the right. For a shift left or shift right operation, input B on line 17 is kept at a logic "zero" level; however, for a shift and add operation line 17 would contain operand B. The A control signal on line 26 is used for operations such as subtracting or negating.

Line 13 is connected to a current carrying electrode of an N-channel transistor 19 whose gate electrode is connected to control line 24. Transistor 19 has its other current carrying electrode connected to a node 23. Input line 10 is connected to a current carrying electrode of an N-channel transistor 20 which has its gate electrode connected to control line 25. The other current carrying electrode of transistor 20 is connected to node 23. Input line 11 is connected to a current carrying electrode of transistor 21 which has its gate electrode connected to control line 26. The other current carrying electrode of transistor 21 is connected to node 23. Input line 12 is connected to a current carrying electrode of transistor 22 which has its gate electrode connected to control line 27. Transistor 22 has its other current carrying electrode connected to node 23. Control lines 24 through 27 are also used to control additional bit sections of the ALU. As an example, another bit section of the ALU would have as the four inputs, from which to select the first operand, DB1, $\overline{DB1}$, DB0 ($\overline{DB1-1}$), DB2 ($\overline{DB1+1}$).

Node 23 is connected to one of the current carrying electrodes of an N-channel transistor 32. Transistor 32 is connected in series with a P-channel transistor 31. An output from the series connected transistors 31 and 32 is taken from a node formed between the two transistors. Transistors 31 and 32 have their gate electrodes connected to a line 28 which carries a timing control signal illustrated as $\phi_2$. The selected input appearing at node 23 is strobed to the input of an inverter 34 by timing control signal $\phi_2$. A P-channel transistor 33 is connected from the input of inverter 34 to a power supply terminal 30. Transistor 31 also has one of its current carrying electrodes connected to power supply terminal 30. The output of inverter 34 goes to the gate electrode of transistor 33, to an input of OR gate 36, and to an input of NAND gate 42. Transistor 33 forms a latch with inverter 34 when the output of inverter 34 is a logic "zero".

OR gate 36 has a second input coupled to an input line 17 which carries a second operand (B) into the ALU. The first operand would be the selected signal appearing at node 23. It should be noted that control signal $\overline{A}$ selects input line 10 (DB$_n$) whereas control signal A selects input line 11 ($\overline{DB_n}$). The signal appearing on input line 11 is the complement of the signal appearing on input line 10; however, before this signal reaches the input to OR gate 36 it passes through inverter 34 thereby appearing in the desired polarity. In a typical ALU wherein a first operand A and a second operand B are being logically combined the A operand would appear at the output of inverter 34 whereas the B operand would appear on input line 17. The output of OR gate 36 goes to an input of NAND gate 37. A second input of NAND gate 37 is coupled to a function select (S1) line 38.

An exclusive NOR gate is formed by a P-channel transistor 46, an N-channel transistor 44, a transmission gate 45, and an inverter 43. The input of the inverter is connected to the output of NAND gate 37, to an input of NOR gate 49 and to a current carrying electrode of transistor 44. The input of inverter 43 is also connected to one of the control inputs of transmission gate 45. The output of inverter 43 is connected to the P-channel control electrode of transmission gate 45 and to a current carrying electrode of transistor 46. The output of transmission gate 45 is connected to a current carrying electrode of transistor 46 and to a current carrying electrode of transistor 44. The input to transmission gate 45 is connected to the gate electrodes of transistors 44 and 46 and to the output of NAND gate 42. Transmission gate 45 can be of the well-known type having an N-channel and a P-channel transistor connected in parallel wherein the gate electrode of the P-channel transistor is connected to the output of inverter 43 and the gate electrode of the N-channel transistor is connected to the input of inverter 43. The exclusive NOR gate formed by transistors 44 and 46, transmission gate 45 and inverter 43 provides a summing result for operands A and B. The output of this exclusive NOR gate is coupled to gate electrodes of N-channel transistors 54 and 58 and to one of the current carrying electrodes of transistors 53 and 57.

NAND gate 42 receives operand A from inverter 34, operand B from line 17, and a function control input (S2) from line 39. The output of NAND gate 42 goes to an input of AND gate 48 and to the gate electrodes of transistors 44 and 46. The output of AND gate 48 goes to an input of NOR gate 49. NOR gate 49 also receives the output from NAND gate 37 and receives an input from line 41. Line 41 carries a logic control (L) signal which controls the carry out (C$_{OUT}$) signal generated by NOR gate 49. When the control signal (L) on line 41 is a low level, the ALU is performing an arithmetic operation, whereas, when the control signal (L) on line 41 is a high logic level then the ALU is performing a logic function. AND gate 48 also receives an input from inverter 52. Inverter 52 receives a carry-in signal (C$_{IN}$) on line 51. The carry-in signal is only for arithmetic operations and is kept low during logic operations. The carry-out C$_{OUT}$ is connected to the carry-in C$_{IN}$ of the adjacent ALU portion of a multiple bit ALU.

An exclusive NOR circuit is formed by N-channel transistors 53 and 54. An exclusive OR circuit is formed by N-channel transistors 57 and 58, and an inverter 52. Transistors 55 and 59 transfer the output of the exclusive NOR and exclusive OR circuits respectively, to a storage cell which will be described hereinafter. The gate electrode of transistor 53 is connected to the carry-in line 51. Transistor 53 has a current carrying electrode connected to the gate electrodes of transistors 54 and 58. The other current carrying electrode of transistor 53 is connected to current carrying electrodes of transistors 54 amd 55. A second current carrying electrode of transistor 54 is connected to carry-in line 51. A second current carrying electrode of transistor 55 provides an output for the exclusive NOR circuit. The gate electrode of transistor 55 is connected to line 56 which carries timing control signal $\phi_2$ which is the same timing control signal appearing on line 28. Transistor 58 has its gate electrode connected to the gate electrode of transistor 54 and has one of its current carrying electrodes connected to the output of inverter 52. The other current carrying electrode of transistor 58 is connected to the current carrying electrodes of transistors 57 and 59. The second current carrying electrode of transistor 57 is connected to the gate electrodes of transistors 54 and 58. The gate electrode of transistor 57 is connected to the output of inverter 52. A second current carrying electrode of transistor 59 provides the output for the exclusive OR gate and is connected to the input of inverter 61 and to the output of inverter 62. Inverter 61 has its output connected to the input of inverter 62 and to a current carrying electrode of transistor 55 which provides the output for the exclusive OR gate. Inverters 61 and 62 form a RAM cell which is used as a temporary storage means for the portion of the ALU illustrated in FIG. 1. The output of this temporary storage means can be coupled by N-channel transistor 63 to data bus 14. The temporary storage means is also coupled to complementary data bus 15 by an N-channel transistor 64. Transistors 63 and 64 have their gate electrodes connected to a control line 65 which carries the result or sum to data bus control signal. Line 65 is generally activated when the function to be performed by the ALU is completed and the results are stored in the RAM cell and it is desired to transfer these results onto the data bus and its complement data bus. It will be noted that the temporary storage means formed by inverters 61 and 62 is thus capable of driving data buses 14 and 15.

The output of the RAM cell formed by inverters 61 and 62, is also connected to the gate electrode of an N-channel field effect transistor 66. In a typical ALU transistor 66 will appear in series with other transistors having their gate electrodes connected to the other RAM cells of the other portions of the ALU. One end of these series connected transistors can be connected to a signal source and the other end of the series connected transistors can be monitored to determine if all of the transistors are enabled. If they are enabled, it indicates that each of the RAM cells is storing a zero. This provides a simple test as to whether the ALU has all zeros which information is useful in branch instructions and in some arithmetic operations. Most microprocessors are designed to set a flag in a condition code register if the result of certain arithmetic operations is zero.

The ALU illustrated in FIG. 1 is capable of selecting one of four inputs which will serve as the A operand. The selected input is strobed, when $\phi_2$ appears on line 28, to first logic means where it is logically combined with the second operand input B appearing on line 17. In a preferred embodiment the input appearing on line 10 is coupled in a latching manner from data bus 14. The same is true for the input appearing on line 11, which is coupled in a latching manner from data bus 15. It is possible to connect input line 10 directly to data bus 14 and input line 11 directly to data bus 15; however, ALU operating speed would be impaired and inverters 61 and 62 would have to be made larger to drive the additional load.

FIG. 2 is a table illustrating some of the functions which can be performed by the ALU. Along the left-hand side of the table are listed the functions which are adding, exclusive ORing, ANDing, placing zeros on the data bus, shifting left, or shifting right. The X's used in the table indicate that that particular input can be in either state without effecting the desired functional operation.

The circuitry illustrated in FIG. 1 contains a total of fifty transistors. Of this total number, thirty-one are N-channel transistors and nineteen are P-channel transistors. Since there are less P-channel transistors, the circuit can be made smaller since less substrate area is needed. This makes the layout more efficient and also results in faster circuit operation.

I claim:

1. A CMOS static ALU comprising:
   selection means for selecting a first operand from a plurality of inputs;
   NOR logic means for providing an output representing the logical NOR of the first operand and a second operand in response to a first control signal;
   NAND logic means for providing an output representing the logical NAND of the first and second operands;
   first exclusive NOR logic means for providing an output representing the logical exclusive NOR of the outputs of the NOR and the NAND logic means;
   second exclusive NOR logic means for providing an output representing the logical exclusive NOR of the output of the first exclusive NOR logic means and a carry input; and
   storage means for storing the output of the second exclusive NOR logic means for output from the ALU.

2. The ALU of claim 1 wherein the selection means has a single transistor for each of the plurality of inputs, for selecting the respective input.

3. The ALU of claim 2 wherein each of the single transistors is controlled by a respective control signal.

4. The ALU of claim 1 further including a carry generator for generating a carry output from the outputs of the NOR and NAND logic means and the carry input.

5. The ALU of claim 1 wherein the storage means comprises a RAM cell having two inverters coupled in a back-to-back configuration.

6. The ALU of claim 5 wherein the second exclusive NOR logic means comprises an exclusive OR gate and an exclusive NOR gate, each having one input thereof coupled to the output of the first exclusive NOR logic means, the other input thereof coupled to the carry input, and the output thereof coupled to the input of a respective one of the inverters of the RAM cell.

* * * * *